April 21, 1953 W. Y. STAMPER 2,635,628
RELEASE VALVE
Original Filed Jan. 29, 1946

Inventor
Willson Y. Stamper
By Henry Lanahan
Attorney

Patented Apr. 21, 1953

2,635,628

UNITED STATES PATENT OFFICE 2,635,628

RELEASE VALVE

Willson Y. Stamper, Newark, N. J., assignor to Thomas A. Edison, Incorporated, West Orange, N. J., a corporation of New Jersey Original application January 29, 1946, Serial No. 644,062, now Patent No. 2,592,207, dated April 8, 1952. Divided and this application August 10, 1950, Serial No. 178,637

6 Claims. (Cl. 137—512)

This application is a division of my application Serial No. 644,062 filed January 29, 1946 and entitled "Portable Battery" now Patent 2,592,207 dated April 8, 1952.

This invention relates to a novel form of release valve and more particularly to such a valve which can be set readily to release at different selected pressures. The invention is especially adapted to serve as a release or vent valve for a battery, but no unnecessary limitation thereto is intended.

It is an object of my invention to provide a novel and improved release valve having a control element operable to set the valve to release at higher and lower pressures above atmospheric pressure.

Another object is to provide a small, compact release valve of simple and economical construction which is adapted especially for the filler opening of a storage battery cell and which is settable to release at different selected internal cell pressures.

A further and more specific object is to provide a novel venting element for a portable minelamp battery, which is set as the battery case is closed to release at a relatively high pressure to prevent accidental spillage of electrolyte during use of the battery and which is set as the battery case is opened to release at a relatively low pressure suitable for charging and effective still to prevent accidental spillage of electrolyte incidental to handling during charging.

These and other objects and features of my invention will be apparent from the following description and the appended claims.

In the description of my invention reference is had to the accompanying drawings, of which:

Figure 1:
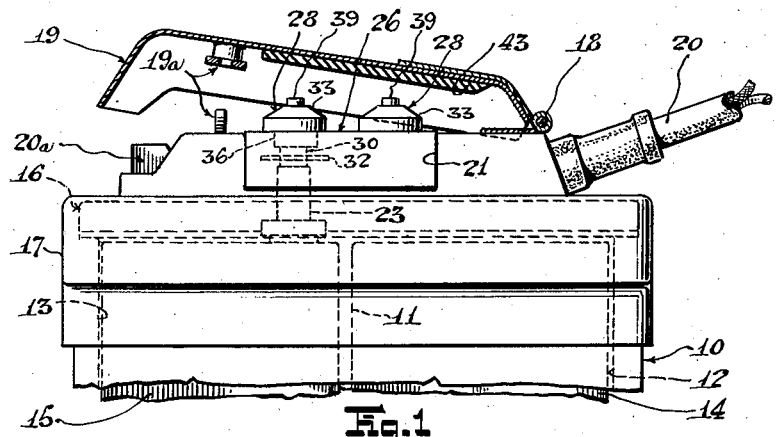
Figure 1 is a fractional elevation of a minelamp battery showing a typical and preferred application of a release valve according to my invention.
Figure 2:
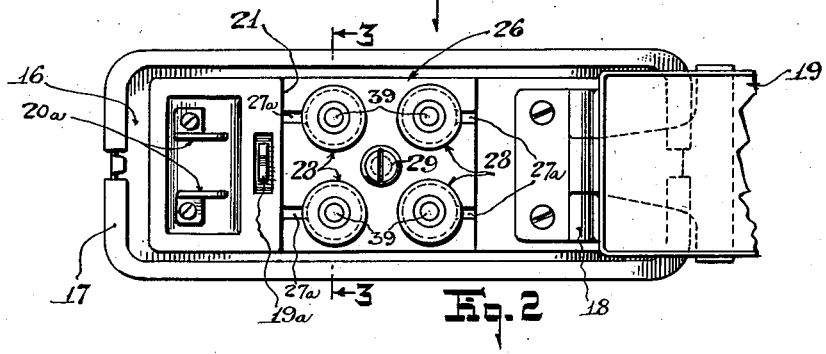
Figure 2 is a top plan view of this battery showing the case cover fractionally and in open position.

The battery fractionally shown in Figures 1 and 2 has an oblong case 10 made for instance of plastic. This case has a central partition wall 11 dividing the interior space into compartments 12 and 13. In these compartments there are respective pairs of battery cells generally referred to as 14 and 15. The case is closed at the top by a lid 16. This lid is clamped tightly onto the case by a surrounding retaining band 17 of the construction disclosed in my pending application Serial No. 118,611 filed September 29, 1949 and entitled "Carrying Case for Portable Battery." Hinged at 18 to the lid is a cover 19 which can be latched closed by any suitable latching means generally referred to as 19a. Extending from the lid at a point adjacent to the hinge 18 is a cable 20 for connecting the battery to a utilization device such as a minelamp (not shown). At the other end of the lid is a pair of charging terminals 20a which are exposed for connection to a charging device when the cover is in the partially-open position shown in Figure 1.

Figures 3, 4:
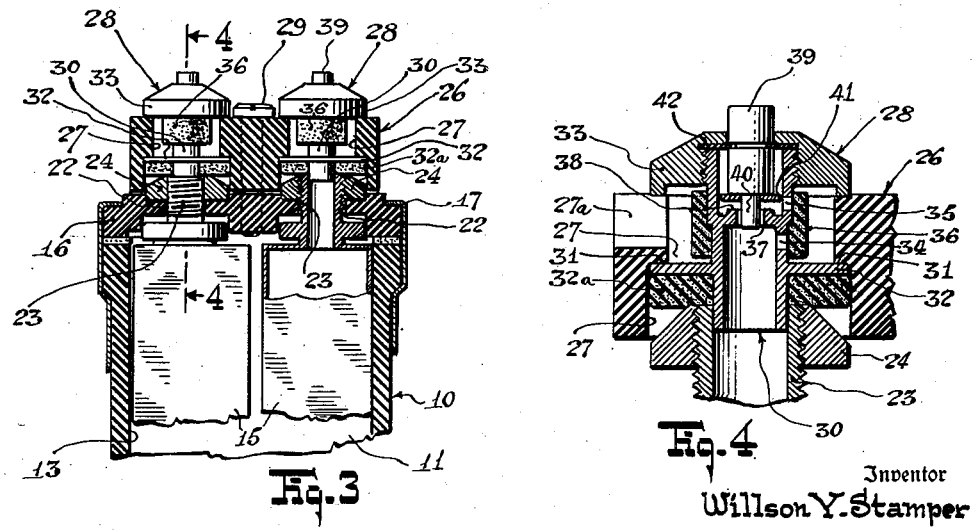
Figure 3 is a principally sectional view on the line 3—3 of Figure 2, showing the release valves of my invention.
Figure 4 is a section to enlarged scale taken on the line 4—4 of Figure 3 to show details of the construction of one of these valves.

The lid 16 projects considerably above the retaining band, but has a wide slot 21 midway its length, which extends throughout the width of the lid. In the bottom wall of this slot 21 there are respective openings 22 for the cells 14 and 15. As shown in Figure 3, each cell has a threaded filler tube 23 having therein a filler opening for the cell. This filler tube extends through the respective opening 22 and has a circular nut 24 threaded thereon to secure the lid to each cell. Although the nuts 24 are inset slightly into counterbores surrounding the openings 22, they extend considerably upwardly into the slot 21. Positioned in this slot is a block 26 having four mounting holes 27 for respective release valves 28. The bottom portions of these holes receive the nuts 24 when the block is in mounted position. The block is held in place by a screw 29 which passes through the central portion thereof and which threads into the lid. The valves 28 are carried with the block 26 so that all can be mounted and removed as a unit. The present invention relates particularly to these valves, wherefore they are herein next described in detail.

Each valve 28 comprises a tubular valve member 30 extending through a mounting hole 27 of the block 26. The mounting hole has an enlarged diameter portion at its inner end to form an interior annular shoulder 31 therein. Each valve tube 30 has an annular flange 32 which fits the enlarged diameter portion of the mounting hole and which seats against the shoulder 31. A circular cap 33 is threaded onto the outer end portion of the valve member against the block 26 to hold the flange 32 in seated relation to the shoulder 31. Embracing a portion of the valve member 30 beyond the flange 32 is a rubber gasket 32a. When the block 26 is mounted in the slot 21 in the inner end of each valve member 30 projects telescopically into the respective filler tube 23 and the gasket 32a is compressed between the flange 32 and the upper edge of the filler tube, by pressure exerted by the screw 29, to seal the valve member to the cell.

The valve member 30 is provided with adjoining intermediate portions between the flange 32 and the outer threaded portion engaged by the cap 33, which intermediate portions have larger and smaller diameters. In these intermediate portions there are respective outlet passageways 34 and 35. On the valve member 30 there is a rubber band or sleeve 36 covering these outlet passageways. This sleeve has a uniform outside diameter and has a lesser inside diameter at one end than at the other to conform to the intermediate portions of the valve member. Accordingly, the sleeve has a lesser thickness portion covering the outlet 35 and a greater thickness portion covering the outlet 34. This causes the portion of the sleeve overlying the outlet 35 to have a lesser spring constant than has the portion overlying the outlet 34, with the result that with increasing pressure in the cell the outlet 35 will open at a predetermined lower cell pressure and, should the outlet 35 be closed off from the cell and the internal pressure of the cell be allowed to increase further, the outlet 34 will open at a predetermined higher pressure. Typically, the sleeve 36 is made so that the outlet 35 will open at a cell pressure of from one to five pounds per square inch and the outlet 34 will open at a cell pressure between twenty-five and thirty-five pounds per square inch. Whenever either outlet is open, the gas is allowed to escape from the block 26 by way of slots 27a running from the respective mounting holes 27 through the ends of the block.

In the valve member 30 between the outlets 34 and 35 there is a restriction having a central opening 37 surrounded by a valve seat 38. Mounted in the outer portion of the valve member is a plunger 39. This plunger has a guide stem 40 extending loosely through the opening 37 and has a resilient disk 41 mounted thereon at the base of the stem for engaging the valve seat 38 to close the opening 37 whenever the plunger is depressed. The outer end portion of the plunger extends loosely through a central opening in the cap 33. However, the plunger is sealed gas-tight to the cap by means of an annular diaphragm 42 the inner edge of which is sealed to the plunger and the outer edge of which is clamped tightly by the cap 33 against the outer edge of the valve member. This diaphragm is yieldable and normally holds the plunger 39 in open position with respect to the valve seat 38 as shown in Figure 4. In this position of the plunger both outlets 34 and 35 are in communication with the interior of the cell. The outlet 35, which is opened at the lower inlet pressure, is then controlling to prevent the internal pressure of the cell from exceeding the lower limit abovementioned. If the plunger 39 is depressed inwardly to close the opening 37, the outlet 35 is sealed off from the battery cell. The outlet 34 is then controlling and will allow the internal pressure of the cell to rise to the upper limit abovementioned.

As the cover 19 is closed, it impinges against the plungers 39 to close the openings 37 and to seal the outlets 35 from the respective cells. The outlets 34 are then controlling to allow the internal cell pressure to rise to the higher limit abovementioned before the valve will release. In order that the plungers 39 will be held in closed positions under suitable pressure so long as the cover is latched in closed position, the cover is provided with a resilient pad 43 on its inner wall portion overlying the block 26.

The setting of the valves to release at higher internal cell pressures of the order of twenty-five to thirty-five pounds per square inch, by the closing of the battery container as above described, is adapted to permit a wide margin of pressure build-up in the respective cells, which is normally greater than will occur during a day's use of the battery or between successive chargings, so that electrolyte spillage will normally be prevented should the battery be inverted during its use in the field. The setting of the release valves to open at a lower pressure of the order of one to five pounds per square inch, as the cover is opened to expose the charging terminals 20a, allows a suitable margin of pressure build-up during charging which is normally sufficient to prevent spillage of electrolyte should the battery be inverted during handling incidental to the charging operation. The particular release pressures herein stated have been found to be suitable for mine lamp batteries for the purposes herein described. It will be understood however that the release pressures may be varied, as by appropriate selection of the wall thickness of the sleeve 36, according to the needs of each application of the valves.

I have herein shown and described a preferred embodiment of a release valve according to my invention, but this description is intended to be illustrative and not limitative of the invention since the same is subject to changes and modifications without departure from the scope of my invention, which I endeavor to express according to the following claims.

I claim:

1. A release valve comprising a tubular member having an inlet and two peripheral outlets communicating with said inlet, a resilient band embracing said tubular member, said band comprising portions of different thicknesses covering said outlets respectively and responsive to cause said outlets to open at different inlet pressures, and mechanically-operable valve means between said inlet and one of said outlets.

2. A release valve comprising a tubular member having an inlet passageway at one end and having portions of different diameters provided respectively with outlet passageways, a resilient band embracing said tubular portions, said band having a substantially uniform outside diameter and having different inside diameter portions conforming to said tubular portions to cause said outlet passageways to open at different inlet pressures, a control valve in said tubular member between said outlet passageways for closing off one of said outlet passageways from said inlet, and means at the end of said tubular member opposite said inlet passageway for operating said control valve.

3. A release valve comprising a tubular member having an inlet passageway and two peripheral outlet passageways, yieldable sealing means closing the outer end of said tubular member, a control valve in said tubular member movable from one position to another to close off one of said outlet passageways from said inlet passageway, said control valve being connected to said sealing means and being normally held thereby in one of its said positions, and pressure-responsive closure means associated with said outlet passageways and adapted to cause the outlet passageways to open at different inlet pressures.

4. A release valve comprising a tubular member having an inlet passageway at one end and having a plunger at the other end, a yieldable diaphragm sealing said plunger to said tubular member, a pair of peripheral outlet passageways in said tubular member, pressure-responsive means associated with said outlet passageways and adapted to cause them to open at different inlet pressures, and valve means operable by said plunger to close off one of said outlet passageways from said inlet passageway.

5. A release valve comprising a tubular member having an inlet at one end and a plunger at the other end and having adjoining intermediate portions of lesser and greater diameters respectively nearer and farther from said inlet end of the tubular member, each of said portions having a peripheral outlet opening, a common resilient band embracing said intermediate portions of said tubular member and having one section of greater wall thickness overlying the outlet nearer said inlet and having a section of lesser wall thickness overlying the other outlet, a control valve between said outlets operable by said plunger to close off said other outlet from said inlet, and yieldable means sealing said plunger to said tubular member and yieldably holding said control valve in open position.

6. A release valve comprising a hollow conduit having a single main passageway provided with an inlet and separate outlets spaced along said conduit, pressure-responsive closure means associated with said outlets and responsive to pressure at said inlet to cause one of said outlets to open when the inlet pressure exceeds a predetermined lower value and the other of said outlets to open when the inlet pressure exceeds a predetermined higher value, and a shutoff valve in said conduit between said outlets operable to close off one only of said outlets from the said inlet.

WILLSON Y. STAMPER.

References Cited in the file of this patent
UNITED STATES PATENTS

| Number | Name | Date |
| --- | --- | --- |
| 375,748 | Hill | Jan. 3, 1888 |
| 881,234 | Fusch | Mar. 10, 1908 |
| 1,368,315 | Wygodsky | Feb. 15, 1921 |
| 1,800,066 | Glass | Apr. 7, 1931 |
| 1,871,043 | Chalmers | Aug. 9, 1932 |